United States Patent
Leibovich et al.

(10) Patent No.: US 12,337,571 B2
(45) Date of Patent: Jun. 24, 2025

(54) FUEL TANK

(71) Applicant: ISRAEL AEROSPACE INDUSTRIES LTD., Lod (IL)

(72) Inventors: Herman Leibovich, Rehovot (IL); Liron Yechiel, Kfar Shmuel (IL); Rachel Blaut, Kfar Haroeh (IL); Enbal Luster, Shoham (IL); Ofir Katz, Shoham (IL); Eilon Rubin, Raanana (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 378 days.

(21) Appl. No.: 17/908,775

(22) PCT Filed: Mar. 16, 2021

(86) PCT No.: PCT/IL2021/050287
§ 371 (c)(1),
(2) Date: Sep. 1, 2022

(87) PCT Pub. No.: WO2021/186436
PCT Pub. Date: Sep. 23, 2021

(65) Prior Publication Data
US 2023/0140501 A1    May 4, 2023

(30) Foreign Application Priority Data
Mar. 17, 2020   (IL) .......................................... 273373

(51) Int. Cl.
B32B 41/00        (2006.01)
B32B 1/00         (2006.01)
(Continued)

(52) U.S. Cl.
CPC ................. *B32B 1/00* (2013.01); *B32B 3/12* (2013.01); *B32B 5/18* (2013.01); *B32B 7/12* (2013.01);
(Continued)

(58) Field of Classification Search
CPC .... B32B 1/00; B32B 3/12; B32B 5/18; B32B 7/12; B32B 25/08; B32B 25/14;
(Continued)

(56) References Cited

U.S. PATENT DOCUMENTS 10,350,830 B2    7/2019  Bailly et al.
2002/0110658 A1  8/2002  Lucke et al.
(Continued)

FOREIGN PATENT DOCUMENTS

EP        0454978 A1    11/1991
WO     2007045466 A1    4/2007

OTHER PUBLICATIONS

Brewis, et al., "Adhesion to Polyethylene and Propylene", Polymer, vol. 22, Jan. 1981, pp. 7-16.
(Continued)

*Primary Examiner* — Michael N Orlando
*Assistant Examiner* — Joshel Rivera
(74) *Attorney, Agent, or Firm* — Dorsey & Whitney LLP (57) ABSTRACT

The present disclosure provides a fuel-impermeable structural unit for use as a structural element of a fuel tank, including a multi-plies structure made of one or more composite material and polymers, and, a sealing polymeric film structurally bonded to and coating the entire surface of at least one face of the multi-plied structure. The polymeric film is integrated with an underlying external layer of said multi-plies structure, is impermeable to the fuel, is not reactive with the fuel, and can bind to an adhesive for fixing one or more rigid elements thereto.

20 Claims, 4 Drawing Sheets

(51) Int. Cl.
  *B32B 3/12*     (2006.01)
  *B32B 5/18*     (2006.01)
  *B32B 7/12*     (2006.01)
  *B32B 25/08*    (2006.01)
  *B32B 25/14*    (2006.01)
  *B32B 27/06*    (2006.01)
  *B32B 27/08*    (2006.01)
  *B32B 27/40*    (2006.01)
  *B32B 37/12*    (2006.01)

(52) U.S. Cl.
  CPC .............. *B32B 25/08* (2013.01); *B32B 25/14* (2013.01); *B32B 27/065* (2013.01); *B32B 27/08* (2013.01); *B32B 27/40* (2013.01); *B32B 37/12* (2013.01); *B32B 2260/046* (2013.01); *B32B 2270/00* (2013.01); *B32B 2274/00* (2013.01); *B32B 2307/7265* (2013.01); *B32B 2319/00* (2013.01); *B32B 2375/00* (2013.01); *B32B 2605/18* (2013.01)

(58) Field of Classification Search
  CPC ....... B32B 27/065; B32B 27/08; B32B 27/40; B32B 37/12; B32B 2260/046; B32B 2270/00; B32B 2274/00; B32B 2307/7265; B32B 2319/00; B32B 2375/00; B32B 2605/18; B32B 2260/023; B32B 2262/101; B32B 5/02; B32B 5/245; B32B 5/26; B32B 23/10; B32B 25/20; B32B 27/281; B32B 2262/108; B32B 2266/12; B32B 23/08; B32B 25/10; B32B 27/12; B32B 27/283; B32B 27/285; B32B 27/286; B32B 27/288; B32B 27/302; B32B 27/304; B32B 27/306; B32B 27/308; B32B 27/32; B32B 27/322; B32B 27/34; B32B 27/36; B32B 27/365; B32B 27/42; B32B 2262/0269; B32B 5/08; B32B 5/28; Y02T 50/40; B64D 37/06; B60K 2015/03046; B60K 15/03177; B60K 2015/03052; B60K 2015/03144
  USPC ................... 156/60, 64, 350, 351, 378, 379
  See application file for complete search history.

(56) References Cited

U.S. PATENT DOCUMENTS

2014/0239122 A1   8/2014   Hottin et al.
2017/0368769 A1   12/2017  Baumbach

OTHER PUBLICATIONS

Pandiyaraj, et al., "Adhesive Properties of Polypropylene (PP) and Polyethylene Terephthalate (PET) Film Surfaces Treated by DC Glow Discharge Plasma", Vacuum, vol. 83. doi:10.1016/j.vacuum.2008.05.032, 2009, pp. 332-339.

Kwakernaak, et al., "Improvements in Bonding Metals for Aerospace and Other Applications", Woodhead Publishing Series in Welding and Other Joining Technologies, 2012, pp. 235-287.

FUEL TANK

TECHNOLOGICAL FIELD

The present disclosure relates to fuel tanks, particularly to integral fuel tanks for use in aircraft wings, fuselage, etc.

BACKGROUND

One of the challenges in constructing fuel tanks, particularly such intended for use in planes/aircrafts, is to ensure proper sealing to avoid leakage of the fuel into and through the tank's walls and/or through seam lines and material discontinuity areas. The requirement for proper sealing may often be contradictory to the need to control weight of fuel tanks for planes, particularly such intended for installation in the aircraft, typically in the wings.

Integral fuel tanks of aircrafts are usually constructed with an external, relatively thin skins, spars and ribs; joining these elements to create an integral fuel tank renders it difficult to ensure sealing at the areas of contact between the skin and the rigid structural elements.

A typical fuel tank construction involves manufacturing of a skin out of multiple layers of composite materials and/or polymeric materials, either as a multilayer structure that form a solid laminate or as a sandwich structure that comprises a light-weight core encased between dense composite plies. The manufacturing of the skin is followed by adhering of the structural rigid elements thereto (such as spars and ribs), thus obtaining a voluminous structure which can hold fuel. In order to seal the tank's inner surface, sealing materials are applied onto a face of the skin (and at times also on areas of the spars and ribs) that comes into contact with the fuel. As the tank needs to be leak-proof, a number of different sealing materials are applied one on top of the other in order to obtain proper sealing. Such constructions are typically complicated and lengthy to produce, and often significantly increases the total weight of the fuel tank.

Other methods of sealing fuel tanks require inclusion of a flexible bladder positioned within the tank as an internal lining, which is capable of expanding once fuel is introduced into the bladder.

General Description

According to some aspects of the presently disclosed subject matter there are provided fuel tanks, skins and rigid elements for their construction. The skins according to at least some examples of the presently disclosed subject matter can provide a high degree of sealing in a fuel tank constructed therefrom, and can simplify the process of producing and sealing the fuel tank.

Thus, according to at least one aspect of the presently disclosed subject matter, there is provided a fuel-impermeable structural unit for use as a structural element (e.g., skin, spars and/or ribs) of a fuel tank, for example of an integral fuel tank. The fuel-impermeable structural unit (to be sometimes referred to herein interchangeably as the "unit") comprises a multi-plies structure that is made of one or more composite material and polymers, and a sealing polymeric film that is structurally bonded to and coats a portion of, or optionally at least the majority of, or optionally, the entire surface of at least one face of the multi-plies structure.

According to an aspect of the presently disclosed subject matter, the polymeric film is integrated with an underlying external layer of said multi-plies structure (in other words it is structurally bonded to the outmost surface of the multi-plies structure). The polymeric film is impermeable to the fuel, is not reactive with the fuel, and is capable of binding to adhesive for fixing (or assembling) one or more rigid elements thereto.

It is noted that, in some embodiments, one or more additional layers may optionally be applied onto at least portions of the polymeric film.

The unit can be planar (i.e., flat), curved, or shaped (for example to form a 3-dimensional shell). The unit can be rigid or semi-rigid.

As noted above, such a unit comprises a multi-plies structure that is made of one or more layers of composite materials, that are typically constituted by one or more fibrous components held together by a thermosetic polymeric resin system (one or more resins). The multi-plies structure can also comprise one or more layers of polymeric material, e.g. polymer foams or honeycomb structures. Such structures can each comprise, for example, several stacked layers/plies of composite materials (e.g., Kevlar, fiberglass, carbon-fiber composite, etc.). In other arrangements, the structure can comprise one or more sandwich units, each comprising two solid/dense plies (which can by themselves be constituted by a single layer or of several layers of composites and/or polymers), holding therebetween a low-density, light-weight core, such as a honeycomb or foam structure, typically made out of polymers. The number, type and thickness of plies in the multi-plies structure is typically determined according to weight and strength requirements, as well as the overall dimensions of the tank that is to be constructed out of the unit.

A unique feature of at least one example of the fuel-impermeable structural unit is a sealing polymeric film that is applied over and coats at least a majority of (optionally the entire) surface of at least one face of the multi-plies structure. Thus, the polymeric film serves as a consecutive final layer over the surface of the multi-plies structure that is designed to come into contact with the fuel. The polymeric film thus forms a complete layer of fuel-impermeable barrier between the content of the tank and the multi-plies structure, thus preventing any leakage of fuel into and/or through the multi-plies structure. Further, as the film coats the surface of the multi-plies structure, no material discontinuities (which can eventually lead to fuel leakage) are formed on the surface of a structural element that is made from the unit and comes into contact with the fuel.

The term impermeable to fuel (or fuel-impermeable) means to denote that the polymeric film is resistant (chemically and physically) to the fuel, as to form an impervious barrier that prevents fuel passage therethrough. The polymeric film is non-porous.

The term not reactive with the fuel means to denote that the polymeric film is non-reactive (chemically and physically) with respect to the fuel, i.e., the polymeric film does not react physically or chemically with the fuel, in particular in a manner that would be expected to affect the structural integrity of the polymeric film and/or that would be expected to affect the impermeability of the polymeric film with respect to the fuel.

The polymeric film is structurally integrated with the multi-plies structure. In other words, the polymeric film constitutes an inseparable layer structurally bonded to the multi-plies structure. As the multi-plies structure comprises polymeric resins that hold the plies together, the resin can also be used in order to bond the polymeric film to the multi-plies structure without the need to utilize an adhesive, as will become apparent from the production process of the unit to be described hereinbelow. Such bonding is known as structural bonding, in which the polymeric film is integrated to the multi-plies structure by a resin which is intrinsic to the multi-plies structure, for example via a co-bonding or co-curing process (i.e., the resin of the composite materials, or a resin and/or an adhesive added to the structure in order to maintain its structural integrity). Such structural bonding results in a polymeric film which is firmly attached to the multi-plies structure, such that a uniform structural strength is obtained (i.e., the structural strength of the polymer film is the same as the structural strength of the entire unit). The structurally bonded polymer film is less susceptible to peeling or tearing from the surface of the multi-plies structure.

However, it is also contemplated by the present disclosure that in some examples the polymeric film can be adhered to the underlying external layer of the multi-plies structure by a suitable adhesive, such that the polymeric film, made from a suitable thermoplastic or thermosetic polymer, is also structurally bonded to the multi-plies structure via the adhesive.

The polymeric film is typically made of a thermoplastic or thermosetic polymer. The term polymer (or polymeric) includes homopolymers, copolymers, such as for example, block, graft, random and alternating copolymers as well as terpolymers, further including their derivatives, combinations and blends thereof. In addition to the above the term includes all geometrical configurations of such structures including linear, block, graft, random, alternating, branched structures, and combination thereof. The term block copolymer is meant to encompass a polymer formed from two or more homo-polymer subunits (blocks) linearly linked by chemical bonds (i.e., the blocks are connected end-to-end). Block copolymers with two, three, four and multiple homopolymer units are referred to as di-block, tri-block, tetra-blocks and multi-blocks respectively. The number of monomer types in a block co-polymer can be less than or equal to the number of blocks. Thus, an ABC linear tri-block consists of three monomer types, whereas an ABA linear tri-block consists of two monomer types.

Non-limiting examples of such thermoplastic resins include: polyolefins, polar thermoplastics, polystyrene, polyvinyl chloride (PVC), acrylonitrile-butadiene-styrene (ABS), styrene copolymers, polyacrylonitrile, polyacrylates, polyacrylamides, vinyl acetate polymers, vinyl alcohol polymers, cellulose plastics, thermoplastic elastomers, thermoplastic polyurethanes, polyester-based thermoplastic elastomers, thermoplastic polyesters, polyethylene terephthalate, polybutylene terephthalate, compatibilized thermoplastic blends, polyacetal, polyethers, polyarylates, polycarbonates, polyamides, polyimides, polybenzimidazoles, aromatic polyhydrazides and polyoxadiazoles, polyphenyl-quinoxalines, polyphenylene sulfide, polyphenylene vinylene, poly (aryl ether sulfone)s, poly(aryl ether ketone)s, poly(aryl ether ketones-co-sulfones), poly(aryl ether ketone amide)s, polytetrafluoroethylene and mixtures thereof.

As noted, the polymeric film can also be made of a thermosetic polymer, which is typically a resin that undergoes curing by heating, a chemical reaction, and/or irradiation. The thermosetic polymer can be selected, in a non-limiting fashion, amongst thermoset silicone polymers such as cured silicone elastomers, silicone gels, and silicone resins; and thermoset organic polymers such as furan resins, amino resins, polyurethanes, polyimides, phenolic resins, nitrile-phenolic copolymers, cyanate ester resins, bismaleimide resins, polyesters, and acrylic resins.

By an embodiment, the polymeric film is made of a thermoplastic polyurethane. By another embodiment, the polymeric film is made of a thermosetic nitrile-phenolic copolymer. By another embodiment, the polymeric film consists of thermoplastic polyurethane, thermosetic nitrile-phenolic copolymer, or a combination of thermoplastic polyurethane and thermosetic nitrile-phenolic copolymer.

In at least some examples, and in order to facilitate construction/assembly of the fuel tank from skins that are constituted by the fuel-impermeable structural unit described herein, the polymeric film is selected to comply with one or more, typically all of the following features: (i) compatibility compatible with various adhesives to enabling strong adherence of rigid elements to the polymeric film, (ii) long-term fuel resistance, (iii) drapeability as to allow complete coverage of the multi-plies structure, (iv) physical stability at manufacturing process parameters, such as a temperature range of between about 18° C. and at least 180° C. and/or pressures between vacuum and about 7 atm, and/or (v) compliance with service conditions.

According to an aspect of the presently disclosed subject matter there is provided a fuel tank that comprises (i) a skin made out of one or more fuel-impermeable structural units described herein, and (ii) one or more rigid elements that comprises two or more spars defining end walls of the fuel tank, and one or more support ribs, each extending between two spars. The skin is fixed to at least the ribs by one or more adhesives applied at least between a connecting surface of the ribs and the polymeric film of said skin.

In other words, rigid elements in the form of spars are bonded at opposite ends of a skin that is made from one or more fuel-impermeable structural units. For example, the skin is bonded to the spars by adhering the skin onto the entire perimeter of the spars, thus resulting in a voluminous structure capable of holding the fuel. In order to obtain a leak-tight tank, the spars can be adhered to the polymeric film, such that, once the tank is constructed, the polymeric film lines the skin sections that come into contact with the fuel. The spars themselves can be constructed by a fuel-impermeable structural units as disclosed herein, thus having a surface that is covered and structurally bonded to a fuel-impermeable polymer film.

As noted above, in at least some examples, the polymeric film of the fuel-impermeable structural unit that forms the skin of the tank covers at least a majority of the surface of the multi-plies structure of the fuel-impermeable structural unit. In this connection, the phrase "majority of the surface" refers to the entire surface of the multi-plies structure that is structurally bonded to the polymeric film, excluding areas of the multi-plies structure onto which the spars are to be adhered.

In other examples, the polymeric film of the fuel-impermeable structural unit completely covers the multi-plies structure.

In other examples, the polymeric film of the fuel-impermeable structural unit covers a portion of the multi-plies structure.

In order to increase structural strength and stability, as well as compartmentalize the volume of the tank (if needed), one or more rigid support ribs are fixed within the tank. The support ribs can be complete (i.e., without cut-outs), or can have one or more cut-outs or openings to maintain a homogenous level of fuel between the compartments formed between the ribs.

In such a fuel tank, the polymeric film, thus, forms a fuel-impermeable barrier between the multi-plies structure of the skin and the rigid elements adhered to the skin— thereby forming a complete and continuous fuel-impermeable barrier over the entire internal surface of the tank.

One or more additional sealing materials can be applied onto the connection areas between the polymeric film and the rigid elements adhered thereto, such as sealing pastes and/or sealing tapes.

One or more reinforcing elements, typically in the form of flexible patches, can be laid-up over locations where the ribs and/or spars are adhered to the skin for mechanical reinforcement.

In some examples, the spars are also made of a fuel-impermeable structural unit as defined herein. In other examples, the ribs are made of a fuel-impermeable structural unit. According to some other examples, both the spars and the support ribs are made of fuel-impermeable structural units.

In at least some examples, the skin can be constituted by two or more units that are attached one to the other, each of the units forming a segment of the skin. Each of the skin segments can be independently attached to the rigid elements in order to form the tank. Attachment can be by any suitable means that facilitates structural integrity of the tank, for example adhesive bonding or riveting. Alternatively, the skin can be formed as a single unit (i.e., in a one-shot process) that is then bonded to the rigid elements. By an embodiment, the skin is made of a single unit, shaped to form a closed-loop structure.

According to an aspect of the presently disclosed subject matter, there is provided a method of producing a fuel-impermeable structural unit for use as a structural element of a fuel tank, the method comprises:

preparing a multi-layer structure comprising a multi-plies sub-structure of one or more plies of composite materials and/or polymers impregnated with one or more polymeric resin, and a sealing polymeric film applied over at least a majority of the surface of at least one face of the multi-plies sub-structure, wherein said polymeric film is impermeable to the fuel, is not reactive with the fuel, and can bind to an adhesive; and curing the multi-layer structure under heat and/or pressure to obtain a multi-plies structure wherein the polymeric film is structurally bonded to and integrated with an underlying external ply of said multi-plies structure, thereby obtaining the unit.

In the context of the present disclosure, the term multi-plies sub-structure denotes a structure comprising two or more plies of composite materials and polymers, held together by an un-cured (or partially cured) thermosetic resin or a thermoplastic resin. As the composite materials typically constitute fibrous material held together by a resin, it can function to hold the plies together before curing. At least a portion of, or a majority of (or alternatively the entire of) one of the external surfaces of the multi-plies sub-structure is covered by the polymeric film. Once construction of the plies is completed, the multi-layer structure including the polymeric layer is cured under conditions of elevated heat and/or elevated pressure (e.g., in an autoclave, oven, etc.), thus activating the resin to bond the plies and polymeric film together to a singular (i.e., monolithic) structural unit, structurally bonding and integrating the polymeric film with an underlying external layer of said multi-plies structure, thus obtaining the structural unit. In such a process, the polymeric film becomes a structural ply of the structural unit.

It is noted that curing can also be carried out at ambient temperature (e.g., about 18° C. to about 30° C.) or out of autoclave/oven.

It is noted that in the multi-plies sub-structure can be constructed out of plies of fibrous material that are a priori impregnated with the resin (i.e., a "pre-preg"), however it is also contemplated that the multi-plies sub-structure be constructed out of dry fibrous layers which are impregnated with resin during lay-up of the plies (what is known as "wet lay-up"). In other embodiments, the multi-plies sub-structure can be prepared by other techniques known in the art, such as resin transform molding (RTM) or liquid resin infusion (LRI).

It is also noted that the polymeric film is applied onto the multi-plies sub-structure as a continuous ply of material, i.e., not in emulsion form that is sprayed onto the surface of the multi-plies structure, as to create a continuous fuel-impermeable barrier on the surface of the multi-plies structure.

The fuel-impermeable structural unit can be produced as a flat unit. Alternatively, the fuel-impermeable structural unit can be rendered with a desired curvature or 3-dimensional shape by forming the multi-layer structure within a shaped mold or tool and curing the multi-layer structure within the mold or tool in order to fixate the final desired shape of the unit (for example the shape of a curved skin, a spar or a support rib).

In another aspect, the disclosure provides a method for producing a fuel tank, that comprises preparing one or more rigid elements comprising two or more spars defining end walls of the fuel tank, and one or more support rib; and fixing (or assembling) one or more skin segments to the one or more rigid elements, the skin segments being made out of a fuel-impermeable structural unit as defined herein, wherein at least the one or more support ribs are adhered onto the polymeric film of the skin during said fixing.

The method can further include applying one or more additional sealing materials at locations of contact between the rigid elements and the skin. The method can also comprise applying one or more reinforcing elements (e.g. flexible patches) over locations where the ribs and/or panels are adhered to the skin to provide mechanical reinforcement of the joining locations. A polymeric film can also be applied onto the reinforcing elements, when used, in order to further seal the reinforcement areas.

According to at least a first aspect of the presently disclosed subject matter, for example including at least one of the aspects and/or examples referred to above, there is provided a fuel-impermeable structural unit for use as a structural element of a fuel tank, comprising:

a multi-plies structure made of one or more composite material and polymers, and a sealing polymeric film structurally bonded to and coating the entire surface of at least one face of the multi-plied structure, wherein said polymeric film:

is integrated with an underlying external layer of said multi-plies structure, is impermeable to the fuel, is not reactive with the fuel, and can bind to an adhesive for fixing one or more rigid elements thereto.

For example, said multi-plies structure comprises a plurality of composite or polymeric plies, held together by a cured resin, or for example said multi-plies structure is in the form of a laminate structure. Alternatively for example said multi-plies structure comprises at least one low-density core, encased between solid plies; for example said core is in the form of a honeycomb structure, or, said core is in the form of a foam core.

Additionally or alternatively, for example, said sealing polymeric film is made of thermoplastic polyurethane, or said sealing polymeric film is made of a thermosetic nitrile-phenolic copolymer, or, said sealing polymeric film is made of a combination of a thermoplastic polyurethane and a thermosetic nitrile-phenolic.

Additionally or alternatively, for example, and in at least some examples, said structural element of the fuel tank is a skin. Alternatively, for example, and in at least some examples, said structural element of the fuel tank is a spar. Alternatively, for example, and in at least some examples, said structural element of the fuel tank is a support rib.

Additionally or alternatively, for example, said unit includes at least one designated zone comprising said sealing polymeric film coated and structurally bonded to said at least one face of the multi-plied structure, wherein said at least one designated zone is designated for binding to an adhesive for fixing one or more rigid elements thereto. For example, the unit is a skin of the fuel tank. Additionally or alternatively, for example, at least one said rigid element is a spar or at least one said rigid element is a rib.

According to the aforesaid first aspect of the presently disclosed subject matter there is provided a fuel tank, comprising a skin and one or more rigid elements, wherein
said skin is made of one or more fuel-impermeable structural units, each of the one or more said units comprising a multi-plies structure made of one or more composite material and polymers, and a sealing polymeric film structurally bonded to and coating the entire surface of at least one face of the multi-plied structure, wherein said polymeric film is integrated with an underlying external layer of said multi-plies structure, is impermeable to the fuel, is not reactive with the fuel, and can bind to an adhesive for fixing one or more rigid elements thereto;
the one or more rigid elements defining end walls of the fuel tank, said rigid elements being bonded to respective designated zones of the skin comprising said sealing polymeric film coated and structurally bonded to said at least one face of the multi-plied structure, via said adhesive.

For example, the one or more rigid elements further comprise one or more spars. For example, the skin can be fixed to at least the spars by one or more adhesives applied at least between a connecting surface of the spars and the polymeric film of said skin.

For example, the one or more rigid elements further comprising one or more support ribs, for example each said support rib extending between the spars defining the end walls of the fuel tank. For example, the skin can be fixed to at least the ribs by one or more adhesives applied at least between a connecting surface of the ribs and the polymeric film of said skin.

Additionally or alternatively, for example, said multi-plies structure is in the form of a sandwich structure comprising a light-weight core encased between dense composite plies. For example, said core is in the form of a honeycomb structure or in the form of a foam core.

Additionally or alternatively, for example, said multi-plies structure is in the form of a laminate structure.

Additionally or alternatively, for example, the skin is formed out of a single said fuel-impermeable structural unit forming a closed-loop structure; alternatively, said skin comprises two or more said fuel-impermeable structural units.

Additionally or alternatively, for example, at least one of the spars and the support ribs are made of a fuel-impermeable structural unit for use as a structural element of a fuel tank according to the first aspect of the presently disclosed subject matter.

Additionally or alternatively, for example, both the spars and the support ribs are made of a fuel-impermeable structural unit for use as a structural element of a fuel tank according to the first aspect of the presently disclosed subject matter.

Additionally or alternatively, for example, said sealing polymeric film is made of thermoplastic polyurethane, or, said sealing polymeric film is made of a thermosetic nitrile-phenolic copolymer, or, said sealing polymeric film is made combination of a thermoplastic polyurethane and a thermosetic nitrile-phenolic.

According to the aforesaid first aspect of the presently disclosed subject matter there is provided a method for producing a fuel-impermeable structural unit for use as a structural element of a fuel tank, comprising:
preparing a multi-layer structure comprising a multi-plies sub-structure of one or more plies of composite materials and/or polymers impregnated with one or more polymeric resin, and a sealing polymeric film applied over the entire surface of at least one face of the multi-plies sub-structure, wherein said polymeric film is impermeable to the fuel, is not reactive with the fuel, and can bind to an adhesive; and
curing the multi-layer structure under heat and/or pressure to obtain a multi-plies structure wherein the polymeric film is structurally bonded to and integrated with an underlying external ply of said multi-plies structure, thereby obtaining the unit.

For example, the multi-plies sub-structure is prepared by stacking a plurality of plies of composite material and/or polymers, each ply being pre-impregnated with a thermosetic resin.

For example, the multi-plies sub-structure is prepared by stacking a plurality of dry plies (dry fabric) of composite material and/or polymers, and impregnating the plies with a thermosetic resin.

For example, the multi-plies sub-structure is prepared by resin transform molding.

For example, the multi-plies sub-structure is prepared by liquid resin infusion.

Additionally or alternatively, for example, curing is carried out in an autoclave, an oven, or at ambient temperature.

Additionally or alternatively, for example, the structural element is a skin, a spar, or a support rib.

Additionally or alternatively, for example, said sealing polymeric film is made of thermoplastic polyurethane, or, said sealing polymeric film is made of a thermosetic nitrile-phenolic copolymer, or, said sealing polymeric film is made combination of a thermoplastic polyurethane and a thermosetic nitrile-phenolic.

According to the aforesaid first aspect of the presently disclosed subject matter there is provided a method of producing a fuel tank, comprising:
preparing one or more rigid elements defining end walls of the fuel tank; and
fixing one or more skin segments to the one or more rigid elements, the skin segments being made out of a fuel-impermeable structural unit as defined herein regarding the first aspect of the presently disclosed subject matter.

For example, the method comprises bonding said rigid elements to respective designated zones of the skin segments comprising said sealing polymeric film coated and structurally bonded to said at least one face of the multi-plied structure, via said adhesive.

Additionally or alternatively, for example, the one or more rigid elements further comprise one or more spars. For example, the skin segments can be fixed to at least the spars by one or more adhesives applied at least between a connecting surface of the spars and the polymeric film of said skin segments.

Additionally or alternatively, for example, the one or more rigid elements further comprise one or more support ribs, for example each said support rib extending between the spars defining the end walls of the fuel tank. For example, the skin segments are fixed to at least the ribs by one or more adhesives applied at least between a connecting surface of the ribs and the polymeric film of said skin.

Additionally or alternatively, for example, said support ribs and said spars are adhered onto the polymeric film of the skin segments during said fixing.

Additionally or alternatively, for example, the method comprises applying one or more additional sealing materials at locations of contact between the rigid elements and the skin.

Additionally or alternatively, for example, the method comprises applying one or more reinforcing elements over locations where the rigid elements are adhered to the skin. For example, the method comprises applying a said polymeric film over the reinforcing elements.

According to at least a second aspect of the presently disclosed subject matter, for example including at least one of the aspects and/or examples referred to above, there is provided a fuel-impermeable structural unit for use as a structural element of a fuel tank, comprising:
   a multi-plies structure made of one or more composite material and polymers, and
   a sealing polymeric film structurally bonded to at least a portion of a surface of at least one face of the multi-plied structure, wherein said polymeric film:
   is integrated with an underlying external layer of said multi-plies structure,
   is impermeable to the fuel,
   is not reactive with the fuel, and
   can bind to an adhesive for fixing one or more rigid elements thereto;
   and wherein said portion includes at least one designated zone comprising said sealing polymeric film coated and structurally bonded to said at least one face of the multi-plied structure, wherein said at least one designated zone is designated for binding to an adhesive for fixing said one or more rigid elements thereto.

For example, said multi-plies structure comprises a plurality of composite or polymeric plies, held together by a cured resin, or for example said multi-plies structure is in the form of a laminate structure. Alternatively for example said multi-plies structure comprises at least one low-density core, encased between solid plies; for example said core is in the form of a honeycomb structure, or, said core is in the form of a foam core.

Additionally or alternatively, for example, said sealing polymeric film is made of thermoplastic polyurethane, or said sealing polymeric film is made of a thermosetic nitrile-phenolic copolymer, or, said sealing polymeric film is made of a combination of a thermoplastic polyurethane and a thermosetic nitrile-phenolic.

Additionally or alternatively, for example, and in at least some examples, said structural element of the fuel tank is a skin. Alternatively, for example, and in at least some examples, said structural element of the fuel tank is a spar. Alternatively, for example, and in at least some examples, said structural element of the fuel tank is a support rib.

For example, the unit is a skin of the fuel tank. Additionally or alternatively, for example, at least one said rigid element is a spar or at least one said rigid element is a rib.

For example, said portion corresponds to the entire surface of said of at least one face of the multi-plied structure.

According to the aforesaid second aspect of the presently disclosed subject matter there is provided a fuel tank, comprising a skin and one or more rigid elements, wherein
   said skin is made of one or more fuel-impermeable structural units, each of the one or more said units comprising a multi-plies structure made of one or more composite material and polymers, and a sealing polymeric film structurally bonded to and coating at least a portion of a surface of at least one face of the multi-plied structure, wherein said polymeric film is integrated with an underlying external layer of said multi-plies structure, is impermeable to the fuel, is not reactive with the fuel, and can bind to an adhesive for fixing one or more rigid elements thereto;
   wherein said portion includes at least one designated zone comprising said sealing polymeric film coated and structurally bonded to said at least one face of the multi-plied structure, wherein said at least one designated zone is designated for binding to an adhesive for fixing said one or more rigid elements thereto;
   the one or more rigid elements defining end walls of the fuel tank, each said rigid elements being bonded to a respective said designated zone of the skin comprising said sealing polymeric film coated and structurally bonded to said at least one face of the multi-plied structure, via said adhesive.

For example, the one or more rigid elements further comprise one or more spars. For example, the skin can be fixed to at least the spars by one or more adhesives applied at least between a connecting surface of the spars and the polymeric film of said skin.

Additionally or alternatively, for example, the one or more rigid elements further comprising one or more support ribs, for example each said support rib extending between the spars defining the end walls of the fuel tank. For example, the skin can be fixed to at least the ribs by one or more adhesives applied at least between a connecting surface of the ribs and the polymeric film of said skin.

Additionally or alternatively, for example, said multi-plies structure is in the form of a sandwich structure comprising a light-weight core encased between dense composite plies. For example, said core is in the form of a honeycomb structure or in the form of a foam core.

Additionally or alternatively, for example, said multi-plies structure is in the form of a laminate structure.

Additionally or alternatively, for example, the skin is formed out of a single said fuel-impermeable structural unit forming a closed-loop structure; alternatively, said skin comprises two or more said fuel-impermeable structural units.

Additionally or alternatively, for example, at least one of the spars and the support ribs are made of a fuel-impermeable structural unit for use as a structural element of a fuel tank according to the second aspect of the presently disclosed subject matter.

Additionally or alternatively, for example, both the spars and the support ribs are made of a fuel-impermeable structural unit for use as a structural element of a fuel tank according to the second aspect of the presently disclosed subject matter.

Additionally or alternatively, for example, said sealing polymeric film is made of thermoplastic polyurethane, or, said sealing polymeric film is made of a thermosetic nitrile-phenolic copolymer, or, said sealing polymeric film is made combination of a thermoplastic polyurethane and a thermosetic nitrile-phenolic.

According to the aforesaid second aspect of the presently disclosed subject matter there is provided a method for producing a fuel-impermeable structural unit for use as a structural element of a fuel tank, comprising:

preparing a multi-layer structure comprising a multi-plies sub-structure of one or more plies of composite materials and/or polymers impregnated with one or more polymeric resin, and a sealing polymeric film applied over at least a portion of a surface of at least one face of the multi-plies sub-structure, wherein said polymeric film is impermeable to the fuel, is not reactive with the fuel, and can bind to an adhesive;

wherein said portion includes at least one designated zone comprising said sealing polymeric film coated and structurally bonded to said at least one face of the multi-plied structure, wherein said at least one designated zone is designated for binding to an adhesive for fixing said one or more rigid elements thereto and curing the multi-layer structure under heat and/or pressure to obtain a multi-plies structure wherein the polymeric film is structurally bonded to and integrated with an underlying external ply of said multi-plies structure, thereby obtaining the unit.

For example, the multi-plies sub-structure is prepared by stacking a plurality of plies of composite material and/or polymers, each ply being pre-impregnated with a thermosetic resin.

For example, the multi-plies sub-structure is prepared by stacking a plurality of dry plies (dry fabric) of composite material and/or polymers, and impregnating the plies with a thermosetic resin.

For example, the multi-plies sub-structure is prepared by resin transform molding.

For example, the multi-plies sub-structure is prepared by liquid resin infusion.

Additionally or alternatively, for example, curing is carried out in an autoclave, an oven, or at ambient temperature.

Additionally or alternatively, for example, the structural element is a skin, a spar, or a support rib.

Additionally or alternatively, for example, said sealing polymeric film is made of thermoplastic polyurethane, or, said sealing polymeric film is made of a thermosetic nitrile-phenolic copolymer, or, said sealing polymeric film is made combination of a thermoplastic polyurethane and a thermosetic nitrile-phenolic.

According to the aforesaid second aspect of the presently disclosed subject matter there is provided a method of producing a fuel tank, comprising:

preparing one or more rigid elements defining end walls of the fuel tank; and fixing one or more skin segments to the one or more rigid elements, the skin segments being made out of a fuel-impermeable structural unit as defined herein regarding the second aspect of the presently disclosed subject matter.

For example, the method comprises bonding said rigid elements to respective designated zones of the skin segments comprising said sealing polymeric film coated and structurally bonded to said at least one face of the multi-plied structure, via said adhesive.

Additionally or alternatively, for example, the one or more rigid elements further comprise one or more spars. For example, the skin segments can be fixed to at least the spars by one or more adhesives applied at least between a connecting surface of the spars and the polymeric film of said skin segments.

Additionally or alternatively, for example, the one or more rigid elements further comprise one or more support ribs, for example each said support rib extending between the spars defining the end walls of the fuel tank. For example, the skin segments are fixed to at least the ribs by one or more adhesives applied at least between a connecting surface of the ribs and the polymeric film of said skin.

Additionally or alternatively, for example, said support ribs and said spars are adhered onto the polymeric film of the skin segments during said fixing.

Additionally or alternatively, for example, the method comprises applying one or more additional sealing materials at locations of contact between the rigid elements and the skin.

Additionally or alternatively, for example, the method comprises applying one or more reinforcing elements over locations where the rigid elements are adhered to the skin. For example, the method comprises applying a said polymeric film over the reinforcing elements.

According to at least a third aspect of the presently disclosed subject matter, for example including at least one of the aspects and/or examples referred to above, there is provided a fuel-impermeable structural unit for use as a structural element of a fuel tank, comprising:

a multi-plies structure made of one or more composite material and polymers, and a sealing polymeric film structurally bonded to at least a portion of a surface of at least one face of the multi-plied structure, wherein said polymeric film:

is integrated with an underlying external layer of said multi-plies structure, is impermeable to the fuel, is not reactive with the fuel, and can bind to an adhesive for fixing one or more rigid elements thereto;

and wherein said sealing polymeric film is made of thermoplastic polyurethane, or wherein said sealing polymeric film is made of a thermosetic nitrile-phenolic copolymer, or, wherein said sealing polymeric film is made of a combination of a thermoplastic polyurethane and a thermosetic nitrile-phenolic.

For example, said multi-plies structure comprises a plurality of composite or polymeric plies, held together by a cured resin, or for example said multi-plies structure is in the form of a laminate structure. Alternatively for example said multi-plies structure comprises at least one low-density core, encased between solid plies; for example said core is in the form of a honeycomb structure, or, said core is in the form of a foam core.

Additionally or alternatively, for example, and in at least some examples, said structural element of the fuel tank is a skin. Alternatively, for example, and in at least some examples, said structural element of the fuel tank is a spar. Alternatively, for example, and in at least some examples, said structural element of the fuel tank is a support rib.

For example, the unit is a skin of the fuel tank. Additionally or alternatively, for example, at least one said rigid element is a spar or at least one said rigid element is a rib.

For example, said portion corresponds to the entire surface of said of at least one face of the multi-plied structure.

Additionally or alternatively, for example, said portion includes at least one designated zone comprising said sealing polymeric film coated and structurally bonded to said at least one face of the multi-plied structure, wherein said at least one designated zone is designated for binding to an adhesive for fixing said one or more rigid elements thereto.

According to the aforesaid third aspect of the presently disclosed subject matter there is provided a fuel tank, comprising a skin and one or more rigid elements, wherein
  said skin is made of one or more fuel-impermeable structural units, each of the one or more said units comprising a multi-plies structure made of one or more composite material and polymers, and a sealing polymeric film structurally bonded to and coating at least a portion of a surface of at least one face of the multi-plied structure, wherein said polymeric film is integrated with an underlying external layer of said multi-plies structure, is impermeable to the fuel, is not reactive with the fuel, and can bind to an adhesive for fixing one or more rigid elements thereto;
  wherein said sealing polymeric film is made of thermoplastic polyurethane, or wherein said sealing polymeric film is made of a thermosetic nitrile-phenolic copolymer, or, wherein said sealing polymeric film is made of a combination of a thermoplastic polyurethane and a thermosetic nitrile-phenolic; and
  the one or more rigid elements defining end walls of the fuel tank, each said rigid elements being bonded to a respective said portion, via said adhesive.

For example, the one or more rigid elements further comprise one or more spars. For example, the skin can be fixed to at least the spars by one or more adhesives applied at least between a connecting surface of the spars and the polymeric film of said skin.

Additionally or alternatively, for example, the one or more rigid elements further comprising one or more support ribs, for example each said support rib extending between the spars defining the end walls of the fuel tank. For example, the skin can be fixed to at least the ribs by one or more adhesives applied at least between a connecting surface of the ribs and the polymeric film of said skin.

Additionally or alternatively, for example, said multi-plies structure is in the form of a sandwich structure comprising a light-weight core encased between dense composite plies. For example, said core is in the form of a honeycomb structure or in the form of a foam core.

Additionally or alternatively, for example, said multi-plies structure is in the form of a laminate structure.

Additionally or alternatively, for example, the skin is formed out of a single said fuel-impermeable structural unit forming a closed-loop structure; alternatively, said skin comprises two or more said fuel-impermeable structural units.

Additionally or alternatively, for example, at least one of the spars and the support ribs are made of a fuel-impermeable structural unit for use as a structural element of a fuel tank according to the third aspect of the presently disclosed subject matter.

Additionally or alternatively, for example, both the spars and the support ribs are made of a fuel-impermeable structural unit for use as a structural element of a fuel tank according to the third aspect of the presently disclosed subject matter.

Additionally or alternatively, for example, said portion includes at least one designated zone comprising said sealing polymeric film coated and structurally bonded to said at least one face of the multi-plied structure, wherein said at least one designated zone is designated for binding to an adhesive for fixing said one or more rigid elements thereto.

According to the aforesaid third aspect of the presently disclosed subject matter there is provided a method for producing a fuel-impermeable structural unit for use as a structural element of a fuel tank, comprising:
  preparing a multi-layer structure comprising a multi-plies sub-structure of one or more plies of composite materials and/or polymers impregnated with one or more polymeric resin, and a sealing polymeric film applied over at least a portion of a surface of at least one face of the multi-plies sub-structure, wherein said polymeric film is impermeable to the fuel, is not reactive with the fuel, and can bind to an adhesive;
  wherein said sealing polymeric film is made of thermoplastic polyurethane, or, said sealing polymeric film is made of a thermosetic nitrile-phenolic copolymer, or, said sealing polymeric film is made combination of a thermoplastic polyurethane and a thermosetic nitrile-phenolic; and
  curing the multi-layer structure under heat and/or pressure to obtain a multi-plies structure wherein the polymeric film is structurally bonded to and integrated with an underlying external ply of said multi-plies structure, thereby obtaining the unit.

For example, the multi-plies sub-structure is prepared by stacking a plurality of plies of composite material and/or polymers, each ply being pre-impregnated with a thermosetic resin.

For example, the multi-plies sub-structure is prepared by stacking a plurality of dry plies (dry fabric) of composite material and/or polymers, and impregnating the plies with a thermosetic resin.

For example, the multi-plies sub-structure is prepared by resin transform molding.

For example, the multi-plies sub-structure is prepared by liquid resin infusion.

Additionally or alternatively, for example, curing is carried out in an autoclave, an oven, or at ambient temperature.

Additionally or alternatively, for example, the structural element is a skin, a spar, or a support rib.

Additionally or alternatively, for example, wherein said portion includes at least one designated zone comprising said sealing polymeric film coated and structurally bonded to said at least one face of the multi-plied structure, wherein said at least one designated zone is designated for binding to an adhesive for fixing said one or more rigid elements thereto.

According to the aforesaid third aspect of the presently disclosed subject matter there is provided a method of producing a fuel tank, comprising:
  preparing one or more rigid elements defining end walls of the fuel tank; and
  fixing one or more skin segments to the one or more rigid elements, the skin segments being made out of a fuel-impermeable structural unit as defined herein regarding the third aspect of the presently disclosed subject matter.

For example, the method comprises bonding said rigid elements to respective designated zones of the skin segments comprising said sealing polymeric film coated and structurally bonded to said at least one face of the multi-plied structure, via said adhesive, said designated zones being provided by at least one said portion.

For example, the one or more rigid elements further comprise one or more spars. For example, the skin segments can be fixed to at least the spars by one or more adhesives applied at least between a connecting surface of the spars and the polymeric film of said skin segments.

Additionally or alternatively, for example, the one or more rigid elements further comprise one or more support ribs, for example each said support rib extending between the spars defining the end walls of the fuel tank. For example, the skin segments are fixed to at least the ribs by one or more adhesives applied at least between a connecting surface of the ribs and the polymeric film of said skin.

Additionally or alternatively, for example, said support ribs and said spars are adhered onto the polymeric film of the skin segments during said fixing.

Additionally or alternatively, for example, the method comprises applying one or more additional sealing materials at locations of contact between the rigid elements and the skin.

Additionally or alternatively, for example, the method comprises applying one or more reinforcing elements over locations where the rigid elements are adhered to the skin. For example, the method comprises applying a said polymeric film over the reinforcing elements.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying drawings, in which.

DETAILED DESCRIPTION

Figure 1A:
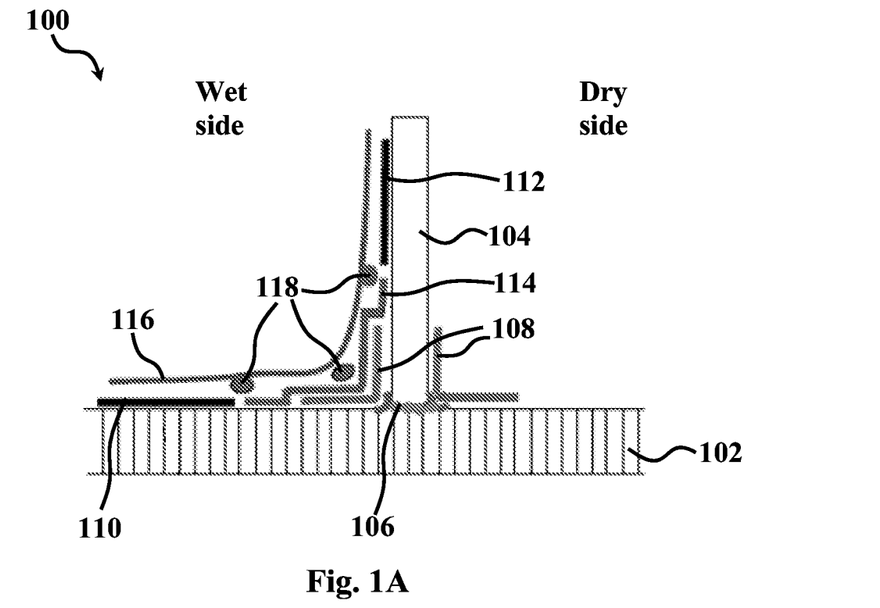
FIGS. 1A and 1B show schematic representations of a section of a fuel tank according to the prior art (FIG. 1A) and according to the present disclosure (FIG. 1B).

Turning first to FIG. 1A, shown is a schematic representation of a section of a typical integral fuel tank according to the prior art. Section 100 of the fuel tank comprises a multilayer structure 102 forming a skin of the fuel tank, with a support rib 104 adhered thereto by adhesive 106. Reinforcement patches 108, typically made of composite layers are laid-up or applied over the regions joining the ribs and the skin for providing mechanical reinforcement to the structure. Additional sealing elements (sheets and/or pastes) 110, 112, 114, 118 are then applied to sections of the surface of the rib and the skin. As common sealing sheets are limited in their ability to be adhered to other surfaces, they are applied as patches or pre-cut sections over the surface of the skins, ribs and spars, resulting in discontinuities and imperfect sealing. Thus, an additional sealing paste 116 needs to be applied in addition to sealant paste 118. As appreciated, such a production process has multiple steps, which both elongates and complicates the construction of the fuel tank. Further, the use of a large variety and number of different layers and sealing means significantly increases the overall weight of the fuel tank.

Figure 1B:
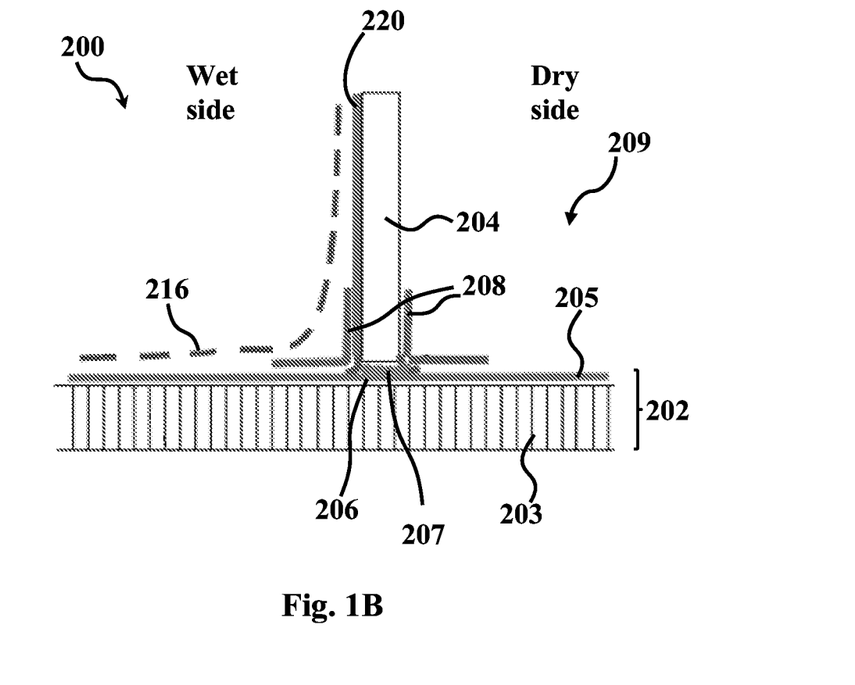

Shown in FIG. 1B is a section of a fuel tank, for example an integral fuel tank, according to an example of the presently disclosed subject matter. As can be seen a section of fuel tank 200 comprises a tank skin 202 with a support rib 204 attached thereto. However, according to aspects of the presently disclosed subject matter the skin 202 is formed from one or more fuel-impermeable structural unit 209, each of which comprises a respective multi-plies structure 203 and a respective sealing polymeric film 205 structurally bonded to the multi-plies structure 203.

The multi-plies structure 203 can be made from any suitable materials, for example as provided above in the section "General Description".

While in this example the multi-plied structure 203 is in the form of a sandwich structure that comprises a light-weight core (for example in the form of a honeycomb structure or in the form of a foam core) encased between dense composite plies, in alternative variations of this example, the multi-plied structure 203 can instead be in the from a laminate structure, for example.

The sealing polymeric film 205 can be made from any suitable materials, for example as provided above in the section "General Description". In at least this example, the sealing polymeric film 205 is made of thermoplastic polyurethane, or from a thermosetic nitrile-phenolic copolymer, or from a combination of a thermoplastic polyurethane and a thermosetic nitrile-phenolic.

The polymeric film 205 is structurally bonded to the surface of at least one face of the multi-plied structure 203, thereby causing the polymeric film 205 to be integrated with an underlying external layer of the multi-plies structure 203.

Furthermore, the polymeric film 205 coats at least a portion of the surface, or alternatively a majority of the surface, or alternatively the entire surface, of at least one face of the multi-plied structure 203.

The polymeric film 205 is configured to be impermeable to the fuel that it is desired to accommodate in the fuel tank.

The polymeric film 205 is configured to be non-reactive with the fuel that it is desired to accommodate in the fuel tank.

For example, such fuel can be aviation fuel.

The polymeric film 205 is configured with the capability to bind to a suitable adhesive for fixing one or more rigid elements thereto. For example, such rigid elements can include rib 204 and/or rigid spars 230, as will become clearer herein.

Although polymeric film 205 is shown for visualization purposes as a separate layer, it is to be understood that polymeric film 205 forms an integral part of the unit 209 that constitutes skin 202, and the polymeric film 205 is structurally bonded to the multi-plies structure 203. As the polymeric film 205 is configured to be fuel-impermeable, the polymeric film 205 forms a continuous, uninterrupted barrier between the fuel and the multi-plies structure 203. It is noted that the rib 204 can be similarly covered by a polymeric film 220 to prevent leakage of fuel into the structure of the rib. The rib 204 is adhered at location 206 to the polymeric film 205 via suitable adhesive 207, and reinforcing patches 208 are optionally placed thereon (optionally comprising a respective polymeric film). Optionally, a sealing paste 216 can be applied, however this is not mandatory.

Such a skin 202, and the respective one or more fuel-impermeable structural unit 209 corresponding thereto, includes at least one such location 206, which is essentially a designated zone comprising the sealing polymeric film 205 coated and structurally bonded with respect to at least one face of the multi-plied structure 203. It is readily evident that such a designated zone is designated for binding to an adhesive for fixing one or more rigid elements thereto, for example for fixing end walls of the tank, a rib or spar to the designated zone via the adhesive.

In some examples, the sealing polymeric film 205 in one such designated zone can be made of thermoplastic polyurethane, for example where the respective rigid element that is to be affixed thereat is expected to be a non-structural element or semi-structural element, and/or for example where such a rigid element is a rib.

In some examples, the sealing polymeric film 205 in one such designated zone can be made of thermosetic nitrile-phenolic copolymer, for example where the respective rigid element that is to be affixed thereat is expected to be a structural element, and/or for example where such a rigid element is a spar.

As can be seen, by utilizing a continuous, structurally integrated polymeric film, the production process of the fuel tank can be simplified, and the overall weight of the fuel tank can be significantly reduced.

Sealing paste can also be added, if required or desired.

Figure 2A:
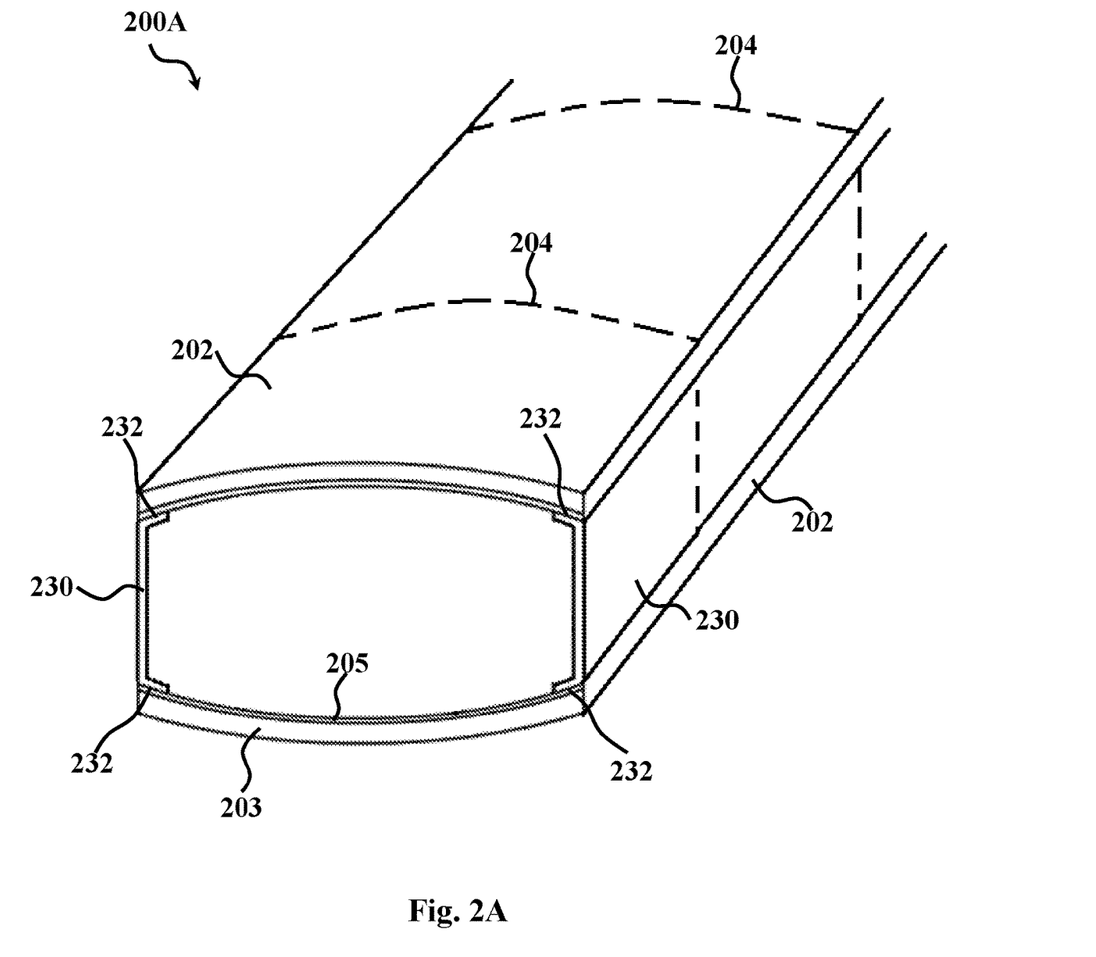
FIG. 2A shows perspective isometric view of a schematic fuel tank according to an embodiment of this disclosure.

A perspective isometric view of a schematic representation of an exemplary integral fuel tank constructed using fuel-impermeable structural units according to this disclosure is shown in FIG. 2A. The fuel tank 200A is constructed out of skin 202 being constituted by fuel-impermeable structural units as described herein. Although skin 202 is shown in this example to have a curvature (e.g., for fitting into a wing section of an aircraft), it is to be understood that the skin can be planar or assume any other desired 3-dimensional configuration. The end walls of the tank can be made from suitable such rigid members, for example spars and/or ribs. In order to form the tank, rigid spars 230 are fixed to the skin 202, e.g., by means of adhering at locations 232. Rigid support ribs 204 are fixed within the tank by adhering them to the spars and the skin at respective said designated zones, thus increasing the strength of the tank and creating compartmentalization of the tank's volume. As can be seen, the polymeric film that is part of the skin 202 forms a continuous fuel-impermeable barrier, lining the entire internal (fuel-facing) surface of the skin.

Figure 2B:
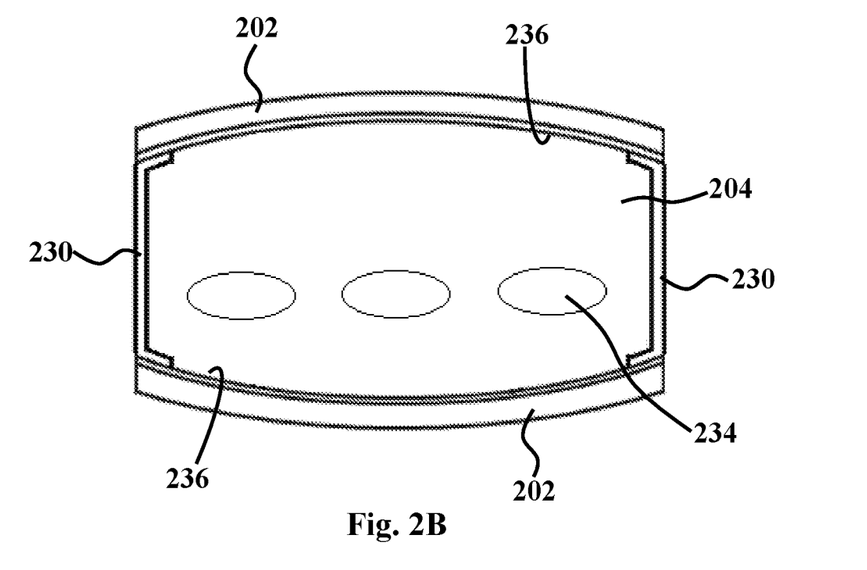
FIG. 2B shows a side view cross-section through a support rib of the fuel tank schematically represented in FIG. 2A.

A side cross-sectional view through a support rib 204 of the tank of FIG. 2A is shown in FIG. 2B. As can be seen, support rib 204 is adhered to the polymeric film of the skin at locations or designated zones 236—hence adherence of the rib to the skin, similar to the adherence of the spars to the skin, does not form discontinuities or non-continuities in the skin, as all rigid elements that are adhered to the skin 202 are not adhered directly to the multi-plies structure 203, but rather to the polymer film 205, which forms a continuous fuel-impermeable barrier. Optionally, rib 204 can include cut-outs or openings 234, that permit free flow of fuel between the compartments formed between two adjacent ribs.

Figure 2C:
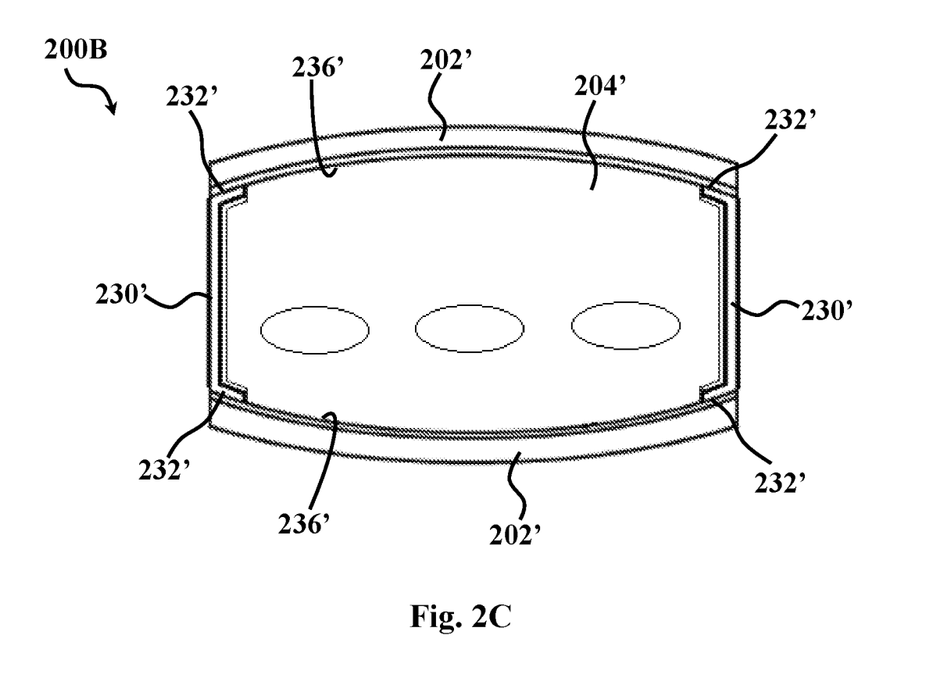
FIG. 2C shows side view cross-section through a support rib of a fuel tank according to another embodiment of this disclosure.

Another exemplary integral fuel tank is shown in FIG. 2C, in which similar functional elements to that of FIG. 2A were designated similar numerals, however marked by a "'" sign. In the example of FIG. 2C, the spars 230' can be made from a unit similar to the unit constituting the skin 202', hence also including a structurally bonded polymeric film on their surface that faces the inside of the tank. Thus, ribs 204' are adhered to the polymeric film coating the spar 230' at locations or designated zones 236', via suitable adhesive.

EXAMPLES

Example 1: Fuel-Impermeability by Vacuum Test

Figure 3:
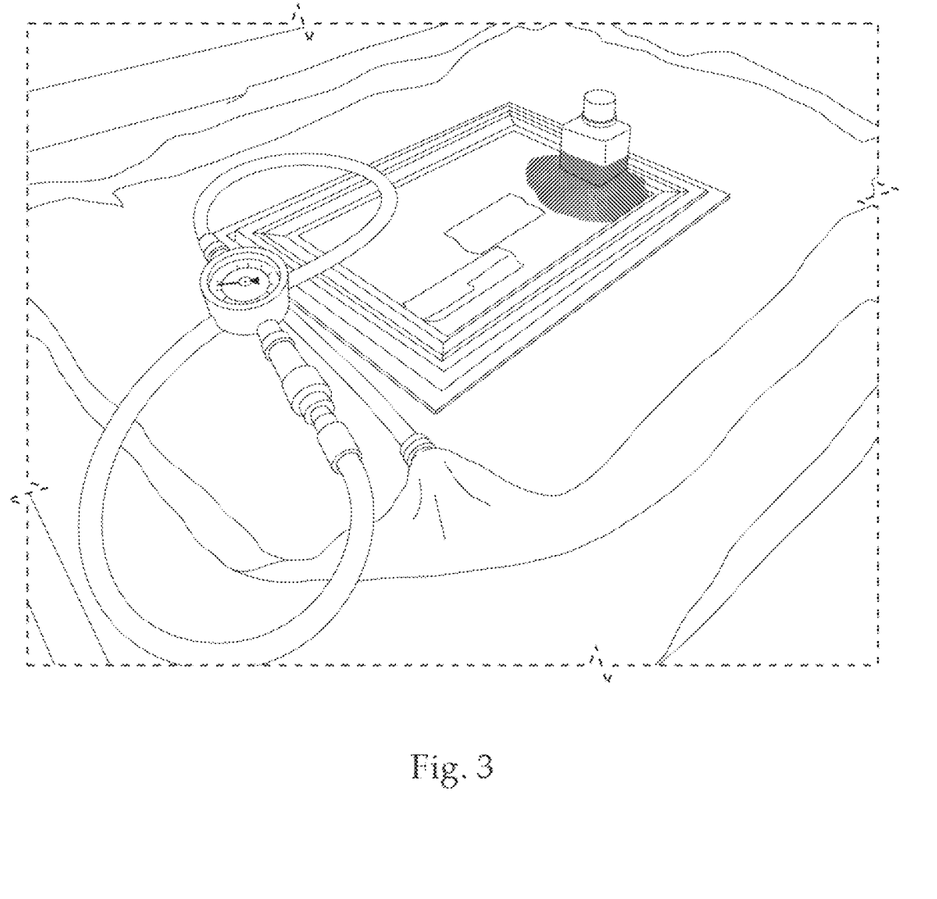
FIG. 3 shows a test set-up for evaluating the fuel-impermeability of the polymeric film.

The polymeric film's impermeability to fuel was assessed as follows: a sandwich panel was coated by a nitrile-phenolic polymeric film or by a polyurethane film. A control sample was prepared from the same sandwich panel, however without a polymeric film. An open-bottomed container filled with fuel was adhered to the polymeric film. The panel was placed in a vacuum bag and vacuum was applied for 7 days. Pressure within the bag was measured throughout the test. The test set-up is shown in FIG. 3, and the results are shown in Table 1.

TABLE 1 vacuum test results:

| Sample | Polymeric film | Thickness of film | Results |
| --- | --- | --- | --- |
| 1 | nitrile-phenolic | 0.254 mm | Vacuum was maintained for over 7 days |
| 2 | nitrile-phenolic | 0.152 mm | Vacuum was maintained for over 7 days |
| 3 | polyurethane | 0.150 mm | Vacuum was maintained for over 7 days |
| 4 | — | — | Vacuum was not maintained |

As can be seen, vacuum was not maintained for the reference sample, while the samples in which the respective panel was structurally bonded to a nitrile-phenolic or polyurethane polymeric films maintained vacuum for over 7 days, indicating that the polymeric films are fuel impermeable.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A fuel-impermeable structural unit for use as a structural element of a fuel tank, the fuel-impermeable structural unit comprising
   a multi-plies structure made of one or more composite materials and polymers, and
   a sealing polymeric film structurally bonded to and coating an entire surface of at least one face of the multi-plies structure, wherein said polymeric film:
   is integrated with an underlying external layer of said multi-plies structure,
   is impermeable to the fuel,
   is not reactive with the fuel, and
   bindable to an adhesive for fixing one or more rigid elements thereto.

2. The fuel-impermeable structural unit according to claim 1, including one of the following:
   wherein said multi-plies structure comprises a plurality of composite or polymeric plies, held together by a cured resin;

wherein said multi-plies structure is in the form of a laminate structure;

wherein said multi-plies structure comprises at least one low-density core, encased between solid plies;

wherein said multi-plies structure comprises at least one low-density core, encased between solid plies, and, wherein said core is in the form of a honeycomb structure;

wherein said multi-plies structure comprises at least one low-density core, encased between solid plies, and, wherein said core is in the form of a foam core.

3. The fuel-impermeable structural unit according to claim 1, wherein said sealing polymeric film is made of thermoplastic polyurethane.

4. The fuel-impermeable structural unit according to claim 1, wherein said sealing polymeric film is made of a thermosetic nitrile-phenolic copolymer.

5. The fuel-impermeable structural unit according to claim 1, wherein said sealing polymeric film is made of a combination of a thermoplastic polyurethane and a thermosetic nitrile-phenolic.

6. The fuel-impermeable structural unit according to claim 1, including one of the following:
   wherein said structural element of the fuel tank is a skin;
   wherein said structural element of the fuel tank is a spar;
   wherein said structural element of the fuel tank is a support rib.

7. The fuel-impermeable structural unit according to claim 1, including one of the following:
   wherein said unit includes at least one designated zone comprising said sealing polymeric film coated and structurally bonded to said at least one face of the multi-plied structure, wherein said at least one designated zone is designated for binding to an adhesive for fixing one or more rigid elements thereto;
   wherein said unit includes at least one designated zone comprising said sealing polymeric film coated and structurally bonded to said at least one face of the multi-plied structure, wherein said at least one designated zone is designated for binding to an adhesive for fixing one or more rigid elements thereto, and, wherein the unit is a skin of the fuel tank;
   wherein said unit includes at least one designated zone comprising said sealing polymeric film coated and structurally bonded to said at least one face of the multi-plied structure, wherein said at least one designated zone is designated for binding to an adhesive for fixing one or more rigid elements thereto, and, wherein the unit is a skin of the fuel tank, and, wherein at least one said rigid element is a spar;
   wherein said unit includes at least one designated zone comprising said sealing polymeric film coated and structurally bonded to said at least one face of the multi-plied structure, wherein said at least one designated zone is designated for binding to an adhesive for fixing one or more rigid elements thereto, and, wherein the unit is a skin of the fuel tank, and, wherein at least one said rigid element is a rib.

8. A fuel tank, comprising:
   a skin and one or more rigid elements, wherein
      said skin is made of one or more fuel-impermeable structural units, each of the one or more said units comprising a multi-plies structure made of one or more composite material and polymers, and a sealing polymeric film structurally bonded to and coating the entire surface of at least one face of the multi-plied structure, wherein said polymeric film is integrated with an underlying external layer of said multi-plies structure, is impermeable to the fuel, is not reactive with the fuel, and can bind to an adhesive for fixing one or more rigid elements thereto;
      the one or more rigid elements defining at least end walls of the fuel tank, said rigid elements being bonded to respective designated zones of the skin comprising said sealing polymeric film coated and structurally bonded to said at least one face of the multi-plied structure, via said adhesive.

9. The fuel tank according to claim 8, including one of the following:
   the one or more rigid elements further comprising at least one of one or more support ribs and one or more spars,
   the one or more rigid elements further comprising at least one of one or more support ribs and one or more spars, and, the skin being fixed to at least the respective ribs and/or the respective spars by one or more adhesives applied at least between a connecting surface of the respective ribs and/or the respective spars, and the polymeric film of said skin.

10. The fuel tank according to claim 8, including at one of the following:
    wherein said multi-plies structure is in the form of a sandwich structure comprising a light-weight core encased between dense composite plies;
    wherein said multi-plies structure is in the form of a sandwich structure comprising a light-weight core encased between dense composite plies, and, wherein said core is in the form of a honeycomb structure or in the form of a foam core;
    wherein said multi-plies structure is in the form of a laminate structure.

11. The fuel tank according to claim 8, including one of the following:
    wherein the skin is formed out of a single said fuel-impermeable structural unit forming a closed-loop structure;
    wherein said skin comprises two or more said fuel-impermeable structural units.

12. The fuel tank according to claim 9, including one of the following:
    wherein at least one of the spars and the support ribs is made of a unit according to claim 1;
    wherein both the spars and the support ribs are made of a unit according to claim 1.

13. The fuel tank according to claim 8, including one of the following:
    wherein said sealing polymeric film is made of thermoplastic polyurethane;
    wherein said sealing polymeric film is made of a thermosetic nitrile-phenolic copolymer;
    wherein said sealing polymeric film is made combination of a thermoplastic polyurethane and a thermosetic nitrile-phenolic.

14. A method for producing a fuel-impermeable structural unit for use as a structural element of a fuel tank, the method comprising:
    preparing a multi-layer structure comprising a multi-plies sub-structure of one or more plies of composite materials and/or polymers impregnated with one or more polymeric resin, and a sealing polymeric film applied over the entire surface of at least one face of the multi-plies sub-structure, wherein said polymeric film is impermeable to the fuel, is not reactive with the fuel, and can bind to an adhesive; and curing the multi-layer structure under heat and/or pressure to obtain a multi-plies structure wherein the polymeric film is structurally bonded to and integrated with an underlying external ply of said multi-plies structure, thereby obtaining the unit.

15. The method according to claim 14, including one of the following:
   wherein the multi-plies sub-structure is prepared by stacking a plurality of plies of composite material and/or polymers, each ply being pre-impregnated with a thermosetic resin;
   wherein the multi-plies sub-structure is prepared by stacking a plurality of dry plies of composite material and/or polymers, and impregnating the plies with a thermosetic resin;
   wherein the multi-plies sub-structure is prepared by resin transform molding;
   wherein the multi-plies sub-structure is prepared by liquid resin infusion;
   wherein curing is carried out in an autoclave, an oven, or at ambient temperature.

16. The method according to claim 14, wherein the structural element is a skin, a spar, or a support rib.

17. The method according to claim 14, including one of the following:
   wherein said sealing polymeric film is made of thermoplastic polyurethane;
   wherein said sealing polymeric film is made of a thermosetic nitrile-phenolic copolymer;
   wherein said sealing polymeric film is made combination of a thermoplastic polyurethane and a thermosetic nitrile-phenolic.

18. A method of producing a fuel tank, the method comprising:
   preparing one or more rigid elements defining at least end walls of the fuel tank; and
   fixing one or more skin segments to the one or more rigid elements, the skin segments being made out of a fuel-impermeable structural unit as defined in claim 1.

19. The method according to claim 17, including at least one of the following:
   bonding said rigid elements to respective designated zones of the skin segments comprising said sealing polymeric film coated and structurally bonded to said at least one face of the multi-plied structure, via said adhesive;
   the one or more rigid elements further comprising at least one of one or more support ribs and one or more spars;
   the one or more rigid elements further comprising at least one of one or more support ribs and one or more spars, and, the skin segments being fixed to at least the respective ribs and/or the respective spars by one or more adhesives applied at least between a connecting surface of the respective ribs and/or the respective spars, and the polymeric film of said skin segments;
   wherein said support ribs and said spars are adhered onto the polymeric film of the skin segments during said fixing.

20. The method according to claim 18, including at least one of the following:
   applying one or more additional sealing materials at locations of contact between the rigid elements and the skin;
   applying one or more reinforcing elements over locations where the rigid elements are adhered to the skin;
   applying one or more reinforcing elements over locations where the rigid elements are adhered to the skin, and, applying a said polymeric film over the reinforcing elements.

* * * * *